April 12, 1932. J. J. HAWXHURST Re. 18,425

LIQUID DELIVERY APPARATUS

Original Filed March 29, 1927 2 Sheets-Sheet 1

INVENTOR
John J. Hawxhurst
BY Philip S. McLean
ATTORNEY

April 12, 1932. J. J. HAWXHURST Re. 18,425

LIQUID DELIVERY APPARATUS

Original Filed March 29, 1927 2 Sheets-Sheet 2

INVENTOR
John J. Hawxhurst
BY Philip S. McKean
ATTORNEY

Reissued Apr. 12, 1932

Re. 18,425

UNITED STATES PATENT OFFICE

JOHN J. HAWXHURST, OF BROOKLYN, NEW YORK, ASSIGNOR, BY DIRECT AND MESNE ASSIGNMENTS, TO LIQUID DISPENSING SYSTEMS, INC., OF BROOKLYN, NEW YORK, A CORPORATION OF NEW YORK

LIQUID-DELIVERY APPARATUS

Original No. 1,742,208, dated January 7, 1930, Serial No. 179,334, filed March 29, 1927. Application for reissue filed January 7, 1932. Serial No. 586,155.

This invention relates particularly, though not exclusively, to the handling of gasoline and liquids of a similar hazardous nature.

Special objects of the invention are to keep the hose or final delivery connection "dry" or empty in the non-delivery condition of the apparatus and to take the pressure off the delivery line leading up to the hose, when the apparatus is not in use. Collateral objects are to provide simple means, conveniently accessible at the delivery nozzle of the hose for simultaneously admitting pressure to the line and for discharging the liquid in continuously metered supply from the hose.

The foregoing and other desirable objects are attained in this invention by certain novel features of construction, combination and arrangement of parts as hereinafter defined and claimed.

The drawings accompanying and forming part of the specification illustrate the invention embodied in one simple, practical commercial form, but it is to be understood that the structure may be modified as regards this disclosure without departure from the true spirit and broad scope of the invention.

Figure 1:
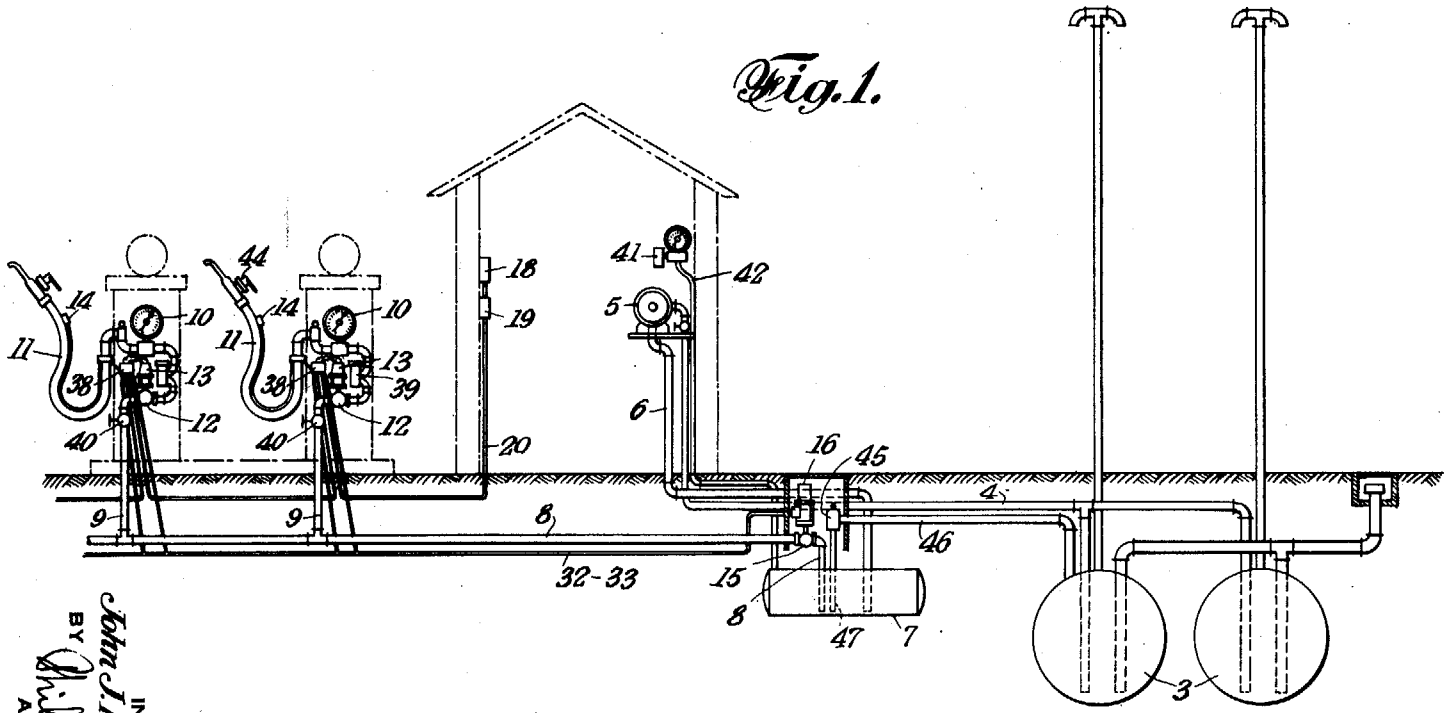
Figure 1 is a side elevation of the complete apparatus with the delivery stands and other portions of the installation indicated in broken lines.

In the particular embodiment herein shown, the gasoline or other liquid is stored in tanks 3 and taken from there by piping 4 and pump 5, which latter discharges by pipe 6 into a delivery or pressure tank 7.

From delivery tank 7 the liquid flows through piping 8 and branches 9 to one or more delivery stands having meters 10 and discharge hoses 11.

The delivery at each stand is controlled by a valve 12 interposed in the feed line and actuated by a magnet 13. This magnet in each case is under control of a push button 14 located on the hose approximately three feet back of the mouth of the nozzle and connected with the magnet by a suitable control cable extending back along the hose.

The delivery line 8 leading to the stands is governed by a control valve 15 actuated by an electromagnet 16.

Figure 2:
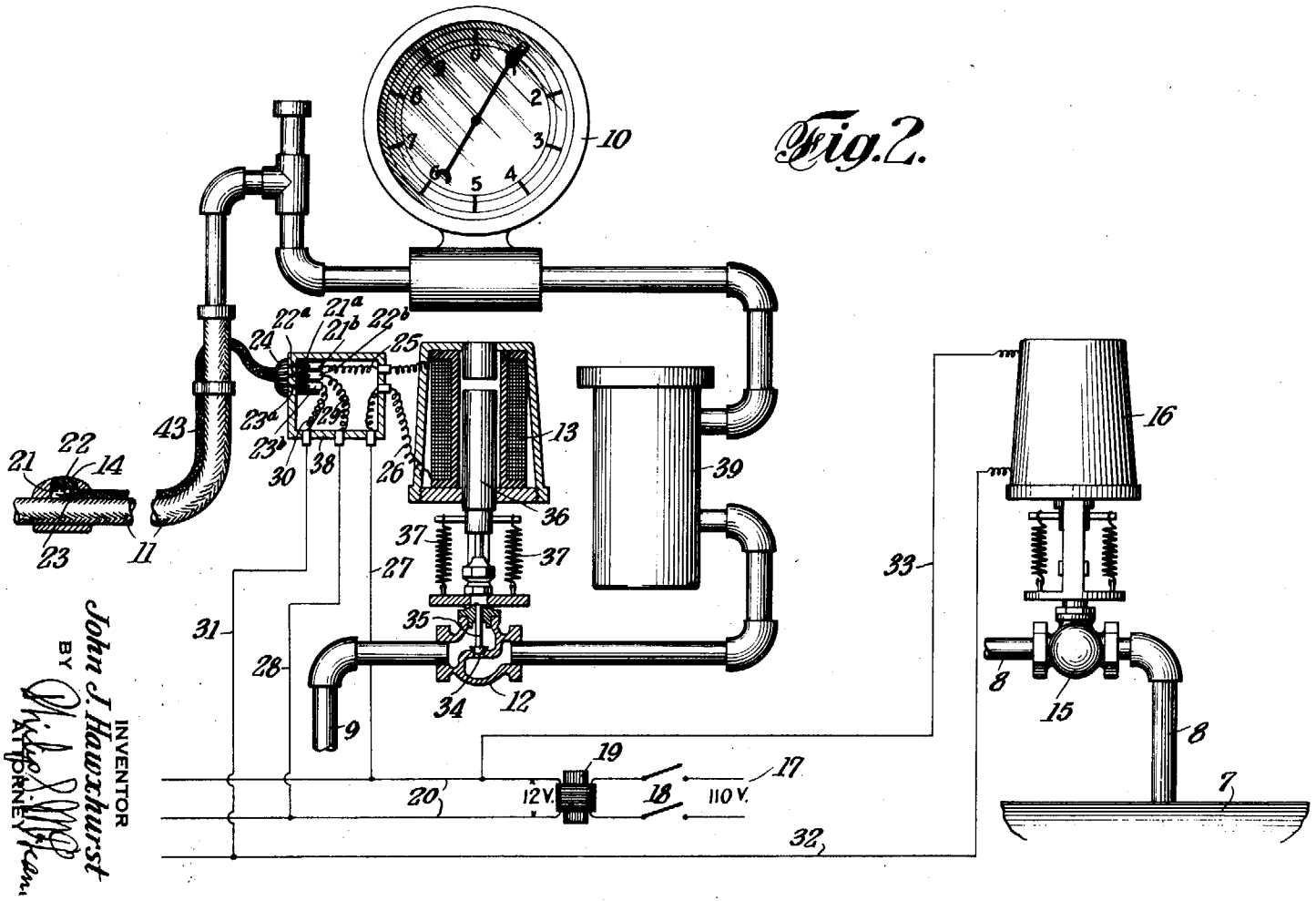
Figure 2 is an enlarged broken and part sectional view illustrating particularly the controls and connections.

The energy for these magnet valves is shown in Figure 2 as taken from an ordinary lighting circuit 17 through switch 18 to a transformer 19 which steps the voltage down for the control circuit 20.

In the present illustration, the push button 14 on the hose closes three contacts at 21, 22, 23 at the outer terminus of the cable 43, this cable having at its inner end a plug 24 carrying blades or prongs $21^a$, $22^a$, $23^a$ coacting with terminal contacts $21^b$, $22^b$, $23^b$. The first of these contacts is shown connected by wire 25 with the delivery magnet 13 which has a wire 26 connecting with the branch 27 of one side of the control circuit 20. From the other side of said control circuit a branch 28 and wiring 29 connect with contact $22^b$. The third terminal, $23^b$, is connected by wiring 30, 31, with a lead 32 extending to the pressure control valve magnet 16, said magnet having a return connection 33 with the other side of the control circuit.

The general structure of the magnet valves is illustrated at the left in Figure 2, being shown as a valve head 34 on a stem 35 to which there is connected a solenoid core 36 operating in the solenoid magnet. This valve is indicated as normally held closed by springs 37 pulling down on the core and valve stem to force the valve to its seat.

The plug terminals are all shown housed in a suitable terminal box 38. The control connections at any hose may be interrupted by simply pulling out the plug 24. Thus the control may be readily cut out whenever desired and the same will be automatically interrupted if the hose should be accidentally torn away from the stand.

A suitable screen for the meter is indicated at 39. A manually operable shut-off valve may be provided at each stand as indicated at 40. The pump 5 is shown as automatically controlled by a pressure actuated switch 41 connected by piping 42 with the pressure tank 7.

The automatic switch 41 is set to cause the pump 5 to transfer liquid from the storage tanks into the pressure tank 7 until the air trapped in said tank above the liquid therein reaches a predetermined pressure, which pressure is sufficient to force the liquid from tank 7 out through the delivery line whenever any of the nozzle valves are opened.

By this automatic control liquid under pressure is maintained in tank 7 ready to be delivered through line 8 and branches 9 to the various delivery stands. To deliver any desired quantity of liquid, therefore, it is only necessary to press the hose button 14 and to open the nozzle valve 44. The push-button simultaneously closes circuits through both the delivery magnet valve 12 and pressure magnet valve 15, opening said valves and permitting the liquid under pressure to flow from the hose under control of the nozzle valve 44. This liquid is metered as it flows through the hose to the nozzle and as much as may be required may be delivered continuously, without interruption, at any time. When the push-button is released, the tank supply valve and the delivery valve both snap closed. This permits the hose to drain free of any liquid and at the same time pressure is taken off the delivery line 8. The latter feature is particularly important because the delivery line is relieved of pressure when not in actual use and any injury to this line, therefore, can only result in loss of the liquid in the line. Thus the delivery tank will not empty itself if there should be a break in the delivery line. At the same time it will be observed that there is no loss in speed of delivery because the liquid in the delivery line beyond the valve 15 is trapped in the line and so becomes immediately available for the next delivery operation.

The main valve is usually underground where it is safely protected from injury. The use of the two valves "in tandem" prevents any "hammer" or back surge which might have a tendency to impart an impulse to the meter when the flow is cut off.

The tank 7 which serves as a receiving chamber for separating air or gas from the liquid and for carrying the liquid under pressure in delivery, also serves as a cushioning means for overcoming "hammer" tendencies. This chamber may vary in size and location, such as to meet particular requirements. The combination disclosed, whether in the precise relation illustrated or modified within the scope of the invention, serves to automatically maintain a substantially constant operating pressure in the system at all times, so as to maintain the meter or measuring device accurate in its operation. The separable plug 24 constitutes one simple means for automatically preventing flow of liquid in case of any abnormal strain or pull on the hose, but same is to be understood as constituting merely one preferred method of accomplishing this novel safety feature.

To prevent an accumulation of pressure within tank 7, which might become injurious or dangerous, an automatic pressure relief valve is indicated at 45 controlling a line 46 extending back to the nearest storage tank 3. This automatic pressure relief device communicates with the contents of the tank or chamber 7 by connection 47 extending to below the normal or desired liquid level therein, so that under conditions of excessive pressure, it will simply return liquid back to the storage tank. This excess pressure control means therefore, does not interfere with the maintenance of the desired air cushion and liquid level in the delivery tank or chamber 7, as covered in Hawxhurst Patent 1,680,457 of August 14, 1928 (filed February 23, 1927), said feature being claimed in the present case in its particular relation to the other features of novelty herein.

I claim:

1. In liquid delivery apparatus, the combination with a delivery stand, a pressure tank and a delivery line extending from said tank to said delivery stand, of a delivery valve in said line at the delivery stand, a positively closing supply valve in said line adjacent the pressure tank and means for substantially simultaneously opening and closing both said delivery valve and said positively closing supply valve.

2. A combination as in claim 1 in which said means are controllable at the delivery stand and in which means are provided for maintaining continuously a body of liquid under pressure in the pressure tank.

3. In combination, a storage tank, a pressure tank, a pump for transferring liquid from the storage tank to said pressure tank, a pressure actuated control for said pump, a pressure control connection extending from said pressure control back to the pressure tank, a liquid delivery line extending from the pressure tank, a valve controlling flow of liquid from the pressure tank into said delivery line, a valve for controlling discharge of liquid from said delivery line and means for actuating said valves substantially in unison.

4. In liquid delivery apparatus, the combination of a liquid supply line and liquid delivery branches extending therefrom, valves controlling the individual branches, a valve controlling the supply line and means for automatically effecting the operation of said supply valve upon the operation of any selected one of the delivery valves, said means including electromagnets by which the valves are actuated and electrical connections extending from the respective delivery valves back to said supply valve.

5. In liquid dispensing apparatus, the combination of a tank for holding a supply of liquid and a liquid delivery line extending from said tank and terminating in a discharge hose, a positively closing valve controlling liquid flow from the tank into said delivery line, a valve in the delivery line adjacent the discharge hose for controlling flow from the delivery line through the hose, a flow meter connected in the delivery line adjacent the hose for continuously registering the discharge of liquid through the hose, a common control on the discharge end of the hose for both said close and more remotely located valves aforesaid and operating connections for said valves including a flexible connection extending from the common control at the discharge end of the hose and back along said hose.

6. In liquid dispensing apparatus, a liquid supply tank, a delivery line extending therefrom and terminating in a liquid discharge connection, an electrical governing device adjacent the discharge connection for controlling flow from the delivery line into said discharge connection, an electrically governed device adjacent the supply tank for controlling liquid flow into the delivery line and electrical means operable at the discharge connection to positively effect substantially simultaneous operation of both said electrical devices to thereby substantially simultaneously start and stop flow in the liquid delivery line at two points, one adjacent the discharge connection and the other adjacent the supply tank.

7. In liquid dispensing apparatus, the combination of a tank for holding a supply of liquid and a liquid delivery line extending from said tank and including at the delivery end a flexible liquid discharge hose, positively closing valves in said liquid delivery line controlling flow from the tank into the liquid delivery line and the delivery of liquid through the discharge hose, a flow meter in the delivery line adjacent the hose for continuously registering liquid discharged through the hose and a common control for both the valves aforesaid including a flexible transmission connection carried by and coextensive with the hose and flexible therewith.

8. In liquid dispensing apparatus, the combination of a liquid delivery line including at the discharge end a flexible liquid delivery hose, means for governing the flow of liquid in said delivery line, and control mechanism for said liquid flow governing means including a flexible transmission connection coextensive with and carried by the hose and means operable in conjunction therewith to automatically interrupt operation of said liquid flow governing means by abnormal strain on the flexible hose.

9. In liquid dispensing apparatus, the combination of liquid delivery means including a liquid and air containing chamber and a discharge hose provided with a nozzle valve, liquid flow controlling means associated with said delivery means, a liquid measuring device operatively related with said liquid delivery means, and means connected with the hose for governing the operation of said liquid flow control means.

10. In liquid dispensing apparatus, the combination of liquid delivery means including a liquid and air containing chamber and a discharge hose provided with a nozzle valve, liquid flow controlling means associated with said delivery means, a liquid measuring device operatively related with said liquid delivery means, and means carried by the hose and operable at a position adjacent the nozzle valve for governing the operation of the liquid flow controlling means.

11. In liquid dispensing apparatus, the combination with a pressure tank or chamber adapted to receive liquid from a suitable supply thereof, of the following instrumentalities, means for transferring or supplying liquid to said chamber and for creating pressure therein, a delivery line connected with said chamber, a dispensing hose or member connected with said delivery line, means for controlling flow of liquid from said chamber to said dispensing member, a measuring unit adapted to measure the liquid dispensed, means to control the discharge of liquid from said dispensing member, said instrumentalities being organized to maintain the liquid contained in said apparatus under substantially constant pressure.

12. In liquid dispensing apparatus, the combination with a pressure tank or chamber adapted to receive liquid from a suitable supply thereof, of the following instrumentalities, means for transferring or supplying liquid to said chamber and for creating pressure therein, a delivery line connected with said chamber, a dispensing hose or member connected with said delivery line, means for controlling flow of liquid from said chamber to said dispensing member, a measuring unit adapted to measure the liquid dispensed, means to control the discharge of liquid from said dispensing member, said instrumentalities being organized to maintain the liquid contained in said apparatus under substantially constant pressure at all times and thereby avoid any tendency to impart an impulse to said measuring device when the discharge of liquid is suspended.

13. In liquid dispensing apparatus, the combination with a pressure tank or chamber adapted to receive liquid from a suitable supply thereof, of the following instrumentalities, means for transferring or supplying liquid to said chamber and for creating pressure therein, a delivery line connected with said chamber, a dispensing hose or member connected with said delivery line, means for controlling flow of liquid from said chamber to said dispensing member, a measuring unit adapted to measure the liquid dispensed, means to control the discharge of liquid from said dispensing member, said instrumentalities being organized to maintain the liquid contained in said apparatus under substantially constant pressure, said means acting to maintain a supply of liquid trapped in said apparatus ready for delivery.

14. In liquid dispensing apparatus, a pressure chamber to receive liquid to be dispensed, means for transferring liquid to said chamber and to create therein a pressure suitable for dispensing said liquid, means to measure the flow of liquid dispensed, and means acting automatically to control the operation of said liquid-transferring and pressure creating means and tending to maintain constant pressure in said apparatus at all times.

15. In liquid dispensing apparatus, the combination of a liquid delivery line including at the discharge end a flexible delivery hose, means for governing the flow of liquid in said delivery line, and control mechanism for said liquid-flow-governing means including means operable automatically by abnormal strain on the flexible hose to interrupt flow of liquid to said hose.

In testimony whereof, I affix my signature.

JOHN J. HAWXHURST.